United States Patent

Wisner

[15] 3,652,805

[45] Mar. 28, 1972

[54] BINARY FREQUENCY IDENTIFICATION SYSTEM

[72] Inventor: Daniel A. Wisner, Detroit, Mich.

[73] Assignee: Information Control Systems, Inc., Ann Arbor, Mich.

[22] Filed: Oct. 10, 1969

[21] Appl. No.: 865,354

[52] U.S. Cl. ........................................179/84 VF, 328/138
[51] Int. Cl. ........................................................H04m 1/50
[58] Field of Search ......................179/84 VF; 328/138, 139

[56] References Cited

UNITED STATES PATENTS 3,517,214 6/1970 Boegeman ........................328/139 X
3,522,544 8/1970 Saldutti et al.........................328/138

*Primary Examiner*—Kathleen H. Claffy
*Assistant Examiner*—William A. Helvestine
*Attorney*—McGlynn, Reising, Milton & Ethington, Martin J. Adelman, Allen M. Krass, Owen E. Perry, Thomas N. Young and Stanley C. Thorpe

[57] ABSTRACT

A binary frequency identification system in which an input signal is simultaneously applied to two channels, one of which includes a low-pass filter selected to attenuate only the higher of the two possible input signal frequencies. The channels are connected to respective inputs of a differential amplifier such that the low frequency input signal produces a small differential output and the high frequency signal produces a large differential output. Logic levels are generated in response to the outputs of the differential amplifier.

7 Claims, 3 Drawing Figures

INVENTOR.
Daniel A. Wisner
BY
Barnard, McGlynn & Reising
ATTORNEYS

BINARY FREQUENCY IDENTIFICATION SYSTEM

This invention relates to signal identification systems of a type capable of positively distinguishing between two input signals of closely spaced frequency.

In the communications field, it is often desirable to transmit information in binary code over a transmission link such as a telephone line by identifying bits of one value with a first tone or frequency and bits of another value with a second tone or frequency. Because the transmission link often exhibits a fairly narrow pass band, the two tones are necessarily closely spaced; for example, one tone may be 2,025 c.p.s. and the other tone may be 2,225 c.p.s. It is then necessary to distinguish between the two tones at the receiving end of the transmission link and to reproduce the information through the generation of logic levels.

In one prior art scheme, the received tones are applied to a bank of frequency selective filters which are in turn connected to respective relays. The received frequency is accepted and passed by only one filter and, thus, only one relay is tripped.

The present invention represents a simplification of such frequency-selective receiver apparatus. The system of the present invention responds to the transmitted tones to generate outputs such as logic levels which correspond to the information represented by the originally transmitted tones or frequencies. In general, this is accomplished by simultaneously applying the received tones, or reduced frequency representatives thereof, to two channels, only one of which includes a frequency-selective attenuating filter, and applying the outputs of the channels to a comparator such as a differential amplifier. The filter may, for example, be selected to pass only the lower of two spaced frequencies without material attenuation. If, for example, a low-frequency tone is received, the outputs of the attenuating and nonattenuating channels differ by only a minimal amount and the comparator produces one output signal. On the other hand, if a higher frequency tone is received, the outputs of the attenuating and nonattenuating channels differ materially and the comparator produces another output signal. In this manner two closely spaced tones are accurately identified and distinguished from one another and are received in such a way as to preserve the logical pattern of information in the transmitted signal.

The various features and advantages of the invention may be best understood by reference to the following specification which describes a specific and illustrative embodiment of the invention.

Figure 1:
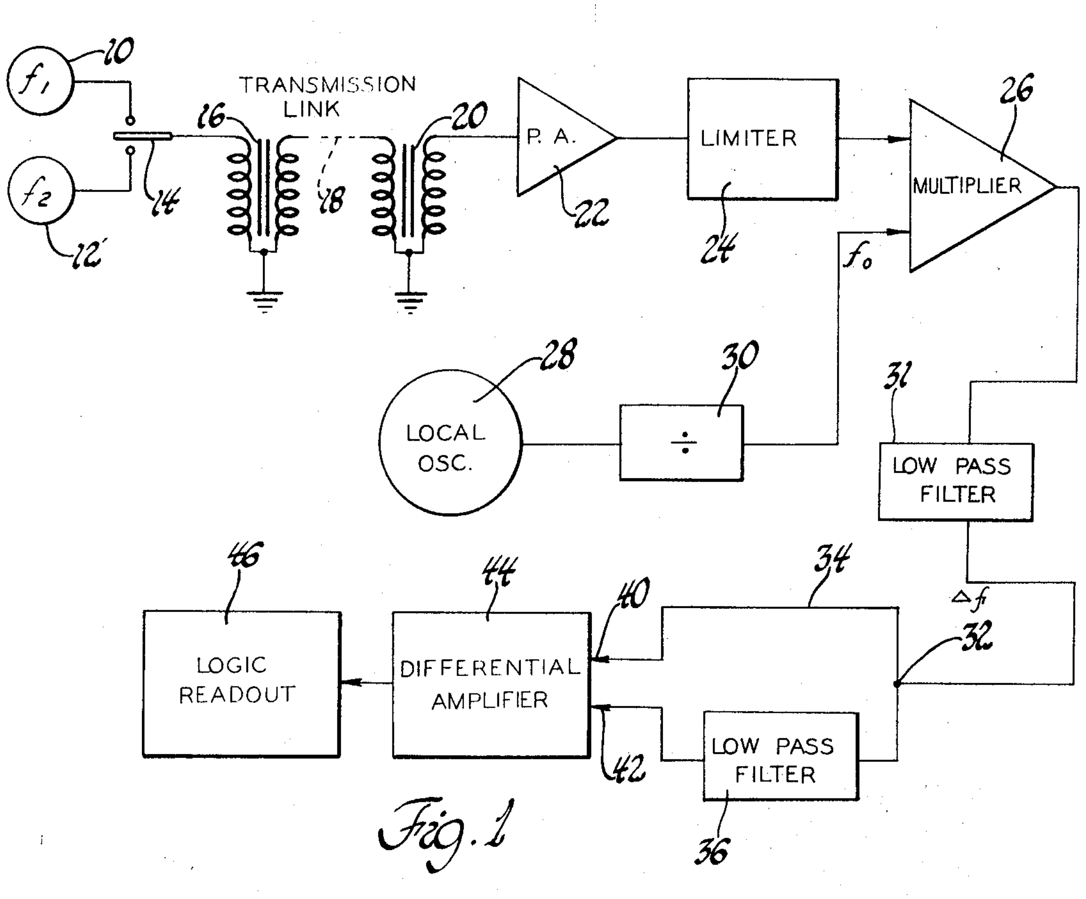
Figure 2:
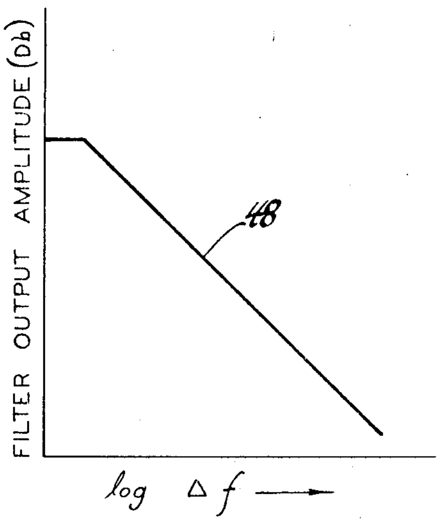
Figure 3:
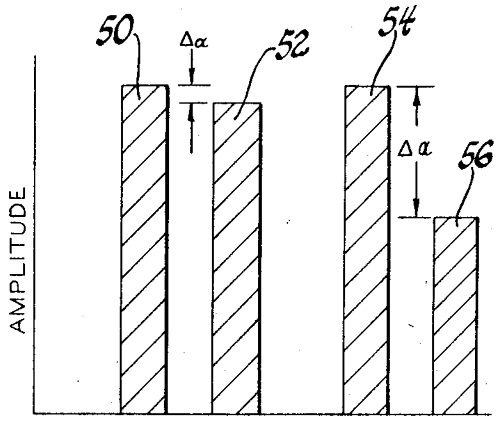

The specification is to be taken with the accompanying drawing of which:

FIG. 1 is a block diagram, partly in schematic detail, of a specific embodiment of the invention, FIG. 2 represents the transfer characteristic of an attenuating frequency selective filter usable in the embodiment of FIG. 1; and, FIG. 3 is an amplitude diagram used in describing the operation of the embodiment of FIG. 1.

In FIG. 2, the tone transmitting apparatus includes first and second tone sources 10 and 12 such as oscillators for producing respective signals at closely spaced frequencies $f_1$ and $f_2$. In an exemplary system, $f_1$ may be 2,025 c.p.s. and used to represent a binary "0" and $f_2$ may be 2,225 c.p.s. and used to represent a binary "1." Sources 10 and 12 are connected to a suitable selective-switching device 14 which sequentially applies the tones $f_1$ and $f_2$ in a coded order to an input transformer 16 for transmission across a transmitting link 18. Transmission link 18 may be a telephone line and is connected to an output transformer 20 at the receiving end, which transformer is connected to a preamplifier 22 which prepares the received sequence of tones for application to a receiver circuit with demodulation means for properly identifying the received tones.

The receiver circuit includes a limiter 24 to eliminate spurious amplitude variations in the received signals. The output of limiter 24 is applied to one input of a mixing circuit 26. The other input to the mixing circuit 26 is a reference tone $f_0$ which is generated by the combination of a local oscillator 28 and a divider circuit 30. Accordingly, the mixing circuit 26 produces output components at frequencies equal to the product, sum, and difference between the two input frequencies. These components are applied to a first low pass filter 31 which passes only the difference frequency component Δf. If, for example, the received signal is 2,025 c.p.s. and the reference signal is approximately 2,025 c.p.s., the difference signal Δf is substantially 0 c.p.s. If, on the other hand, the received tone is 2,225 c.p.s., the difference signal Δf is 200 c.p.s. After such frequency reduction, the 0 c.p.s. signal represents the binary "0" and the 200 c.p.s. signal represents the binary "1."

The difference signal Δf is simultaneously applied to first and second signal channels 34 and 36 having inputs commonly arranged at a junction 32 and respective outputs 40 and 42. Channel 34 is shown as a direct connection to indicate that it exhibits no significant frequency selectivity in the range of interest; and, thus, channel 34 may be regarded as a nonattenuating channel. Channel 36, on the other hand, is shown as a low pass filter having a maximum transfer characteristic at approximately 50 c.p.s. and a rather sharp attenuating curve about 50 c.p.s. as shown in FIG. 2. Filter 36 attenuates the 220 c.p.s. signal to a much greater degree than it attenuates the 0 c.p.s. signal.

Outputs 40 and 42 are connected to respective inputs of a comparator in the form of a differential amplifier 44. The amplifier 44 produces an output voltage related to the amplitude difference between the signals received from outputs 40 and 42 of channels 34 and 36. The output of amplifier 44 is connected to a readout unit 46 which produces a low logic level if the differential amplifier output is below a predetermined threshold and a high logic level if the amplifier output is above the threshold. Unit 46 may also function to convey the logic levels either to a visual indicator or to a storage device such as a magnetic tape or a terminal device for input or output purposes:

Although the operation of the embodiment of FIG. 1 is believed to be apparent from the foregoing description, a detailed description of operation will now be given with reference to the diagrams of FIGS. 2 and 3. The switch 14 is operated to cause a sequence of tones at frequencies $f_1$ and $f_2$ to appear at the upper input of mixer 26. These tones are reduced in frequency by mixing with the reference tone $f_0$ of 2,025 c.p.s. such that the binary "0" signals previously represented by $f_1$ of 2,025 are now represented by a signal of 0 c.p.s. Similarly, the binary "1" signals transmitted at $f_2$ of 2,225 c.p.s. are represented after mixing as 200 c.p.s. It will be observed that after mixing to subtract $f_0$ from each of the tones $f_1$ and $f_2$, the representative signals still differ in frequency by only 200 c.p.s., but this difference now represents a much larger spread measured in terms of the proportion of the absolute frequency of the high frequency signal of 225 c.p.s. This, of course, facilitates the discrimination function.

After filtering out all but the difference frequency Δf at 31, the sequence of reduced frequency tones is applied to common input terminal 32 such that each tone is simultaneously applied to channels 34 and 36. Channel 36 operates as a low-pass filter having a transfer characteristic shown by curve 48 of FIG. 2. According to curve 48, tones at the low-frequency end of the abscissa are attenuated to a much lesser degree than are tones toward the high frequency end. The low frequency cutoff point of filter 36 should be selected to lie above the maximum frequency obtained as the difference of the worst case error frequencies of the oscillator 28 and the received binary "0" signal.

Accordingly, a binary "0" represented by 0 c.p.s. produces at the outputs 40 and 42 signals having respective amplitudes represented by the bars 50 and 52 of FIG. 3. Differential amplifier 44 responds to the minimal amplitude difference between bars 50 and 52 to produce a very small output signal. This signal is interpretted by unit 46 as a binary "0." On the other hand, a binary "1" represented by 200 c.p.s. produces at the outputs 40 and 42 signals having respective amplitudes represented by bars 54 and 56 of FIG. 3. Bar 56 represents the output of channel 36 and is significantly attenuated by the action of the low-pass filter. Amplifier 44 responds to this amplitude difference to produce a large output signal. Readout unit 46 interprets such a signal as a binary "1" since the threshold valve preset into unit 46 is exceeded.

From the foregoing, it can be seen that the illustrative embodiment of the invention responds to the tones $f_1$ and $f_2$ to generate logic levels representing those tones and their binary coded information values by passing representative signals through relatively attenuating and nonattenuating signal channels, comparing the amplitudes of the resulting outputs and generating logic levels in accordance with the results of that comparison.

It is to be understood that the embodiment of FIG. 1 is illustrative of the invention and is not to be construed in a limiting sense.

The embodiments of the invention in which an exclusive property or privilege is claimed are defined as follows:

1. Binary frequency decoding apparatus comprising: means for receiving a sequence of tones of first and second distinct frequencies; first and second signal channels; means for applying the sequence of tones to the channels; bandpass filter means in one of the channels and including a low pass filter for passing tones at one of said frequencies and attenuating tones at the other of said frequencies; and differential detector means responsive to the amplitude difference in the outputs of the channels for generating signals having first and second logic levels corresponding to the receipt of signals at the first and second frequencies.

2. Apparatus as defined in claim 1 including means for generating the sequence of tones, and a transmission link connecting such means to the means for receiving the tones.

3. A binary frequency identification system comprising first and second signal channels each having an input and an output, means for generating a sequence of tones at first and second spaced frequencies and applying the sequence to both of the channels simultaneously; said means for generating further including means for receiving a transmitted signal, a local oscillator, and means for mixing the transmitted signal with the output of the local oscillator for reducing the frequency of the signals applied to the inputs of the channels; one of the channels having bandpass filter means therein for passing only one of the frequencies and for attenuating the other of the frequencies; and comparator means connected to the outputs of the channels for comparing the amplitudes of the signals appearing thereon and generating a first output if the tone applied is the first frequency and a second output if the tone applied is the second frequency.

4. A system as defined in claim 3 including first and second signal sources at first and second spaced frequencies and means for transmitting the first and second frequencies in a predetermined coded succession to said means for receiving.

5. A system as defined in claim 3 including amplitude limiter means connected in series with the means for receiving the transmitted signal.

6. Apparatus as defined in claim 3 including output means connected to the comparator means for generating logic levels corresponding to the first and second outputs.

7. A binary frequency identification system comprising: means for separately transmitting first and second signals at first and second spaced frequencies; first and second signal channels each having an input and an output, a low-pass filter in one of the channels for substantially attenuating only signals of at least the second frequency; means for receiving the first and second signals and applying representations thereof simultaneously to the inputs of the first and second channels; differential amplifier means having inputs connected to the outputs of the signal channels for comparing the amplitudes of the signals thereon and for producing a first output level if the amplitudes differ by less than a predetermined amount and a second output level if the amplitudes differ by more than a predetermined amount, and logic means connected to receive the output levels for indicating which of the frequencies is transmitted.

* * * * *